(12) United States Patent
Rao et al.

(10) Patent No.: US 8,166,253 B2
(45) Date of Patent: *Apr. 24, 2012

(54) MEMORY MANAGEMENT SYSTEM IN A COMPUTER SYSTEM WITH SHARED MEMORY MAPPINGS

(75) Inventors: Anil Rao, San Jose, CA (US); Carl A. Waldspurger, Palo Alto, CA (US); Xiaoxin Chen, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,261

(22) Filed: Aug. 12, 2011

(65) Prior Publication Data

US 2011/0302389 A1 Dec. 8, 2011

Related U.S. Application Data

(63) Continuation of application No. 11/676,151, filed on Feb. 16, 2007, now Pat. No. 8,015,367.

(51) Int. Cl.
*G06F 12/00* (2006.01)
*G06F 13/00* (2006.01)
*G06F 13/28* (2006.01)

(52) U.S. Cl. ....................................... 711/147

(58) Field of Classification Search .................. 711/147
See application file for complete search history.

(56) References Cited

U.S. PATENT DOCUMENTS

| 6,237,059 B1 * | 5/2001 | Dean et al. ..................... 711/100 |
| 6,742,099 B1 * | 5/2004 | Mendoza et al. ............. 711/173 |
| 6,789,156 B1 * | 9/2004 | Waldspurger ..................... 711/6 |
| 2004/0193803 A1 * | 9/2004 | Mogi et al. ..................... 711/129 |
| 2005/0273456 A1 * | 12/2005 | Revanuru et al. ................ 707/1 |
| 2007/0204117 A1 * | 8/2007 | Van Riel et al. .............. 711/159 |

* cited by examiner

*Primary Examiner* — Kevin Ellis
*Assistant Examiner* — Chad Davidson

(57) ABSTRACT

A memory management sub-system includes code executable by a processor fir performing selecting a plurality of contexts, and selecting a sample of the separately allocable portions of an address space for each of the contexts. For each of the selected allocable portions, a corresponding portion of the host memory to which the selected allocable portion is mapped is determined, and a count corresponding to a number of separately allocable portions of any context that are commonly mapped to the corresponding portion of the host memory. For each context, a metric is computed that is a function of the counts for that context. Host memory is allocated among the contexts at least in part based on their respective metrics.

23 Claims, 4 Drawing Sheets

MEMORY MANAGEMENT SYSTEM IN A COMPUTER SYSTEM WITH SHARED MEMORY MAPPINGS

CROSS REFERENCE TO RELATED APPLICATIONS

This application is a continuation and claims benefit of similarly titled U.S. Patent Application entitled "Memory Management Methods In A Computer System With Shared Memory Mappings" having Ser. No. 11/676,151, which was filed Feb. 16, 2007 and granted on Sep. 6, 2011 as U.S. Pat. No. 8,015,367, and which is incorporated herein by reference in its entirety.

BACKGROUND OF THE INVENTION

1. Field of the Invention

This application relates generally to computer systems in which a host is configured to present each of multiple contexts provided to run on the host with an address space that may from time to time be mapped, at least in part, to a corresponding one or more portions of a host memory, and, more specifically, to methods for supporting memory management decisions in such a system.

2. Description of Related Art

In the computer system 100 illustrated in FIG. 1, multiple contexts 102a, 102b, 102c execute concurrently on a host 104 and share some or all of a host memory 106. Because the host memory 106 is usually not large enough to hold the address spaces of all of the contexts at the same time, the contexts usually compete for use of the host memory 106. A memory manager 108 executing on the host 104 is typically provided to resolve these competing requests by deciding which portions, if any, of the address spaces of the contexts 102a, 102b, 102c can be stored in the host memory 106 at a particular time. The system typically includes secondary storage 110, such as a disk or other usually non-volatile mass-storage device, for holding those portions of the address spaces for each of the contexts 102a, 102b, 102c that cannot be accommodated in the host memory 106 at a given time.

The memory manager 108 may attempt to alleviate contention for the host memory 106 by identifying portions of the address spaces of one or more of the contexts that contain identical data, and then mapping those portions to the same portion of the host memory. Examples of such an approach are described in U.S. Pat. Nos. 6,789,156 ("Content-based, transparent sharing of memory units," issued 7 Sep. 2004), and 6,075,938, ("Virtual machine monitors for scalable multiprocessors," issued 13 Jun. 2000), both of which are hereby fully incorporated by reference herein as though set forth in full. Such an approach is beneficial because it tends to allow the host to keep a greater number of contexts resident in memory, and also tends to allow for more efficient operation by necessitating fewer instances of swapping, that is, transferring portions of the contents of the memory to secondary storage (usually, the disk) so as to make room for disk content to be transferred into the thus freed-up memory space. This is typically done because it is usually much faster to access data, code, etc., stored in memory than to have to access the swapped data, code, etc., from secondary storage.

Consider the example shown in FIG. 2, which illustrates the address spaces 112a, 112b, 112c of the contexts 102a, 102b, 102c, respectively, in the computer system of FIG. 1 at a particular time. In this particular example, memory manager 108 is configured to map identical portions of the same or different address spaces to the same portion of the host memory 106. As illustrated, portions 114, 116 and 126 of the address spaces 112a and 112b are identical and therefore mapped to the same portion 120 of the host memory 106 through mapping tables 122a and 122b, respectively. Compared to the case where the portions 114, 116 and 126 are mapped to different portions of the host memory (as shown in phantom), the approach of mapping these portions to the same portion 120 of the host memory 106 frees up the portions 124 and 128 for use by another context.

Turning back to FIG. 1, the memory manager 108 is responsible for making memory management decisions in the system from time to time, including decisions such as whether and how much of the host memory 106 to allocate to a particular context, and whether and how much of the host memory 106 to reclaim from a particular context.

To support or optimize these decisions, the memory manager 108 may utilize selected information about the contexts such as, for example, the amount of host memory 106 in active use by a particular context. However, due to the dynamically changing nature of the system, this information may become inaccurate and outdated, rendering it unfit for use by the memory manager 108. Moreover, timely updates of this information are often not possible given the time that may be required to gather this information. Also, certain approximations of this information that have been proposed for use by the memory manager 108 sacrifice an inordinate amount of accuracy for ease and speed of computation, and therefore lend themselves to sub-optimal memory management decisions.

The problem is compounded when the memory manager 108 is configured to map identical portions of address spaces of the same or different contexts to the same portion of the host memory 106. In this case, the amount of host memory 106 allocated to a context will often overstate the true amount of host memory 106 properly allocable to the context. Moreover, an accurate estimate of the amount of host memory properly allocable to a context has proven difficult to compute in real time, and proposed approximations of this statistic are too inaccurate to support reliable memory management decisions.

Additionally, the use of back mapping (also known as reverse mapping), which is mapping from a portion of physical memory back to any corresponding portions of virtual memory, to obtain more accurate computations has not proven feasible because back maps are expensive to implement, consume excessive host resources and spatial overhead, and cannot be easily maintained as fixed-size data structures. In FIG. 2, for example, back mapping would require storing three back map pointers, from portion 120 of host memory 106 back to portions 114 and 126 in address space 112a, and portion 116 in address space 112b. The disadvantages of back mapping become even more severe when the degree of memory-sharing is high. Consider, for example, that in a system where thousands of virtual pages are all mapped to a single, physical page, back mapping would require the storage of corresponding thousands of back map pointers.

SUMMARY OF THE INVENTION

The invention is useful in a computer system in which multiple contexts (for example, processes, which may be virtual machines) reside on a host; each context has an address space divided into separately allocable portions (such as pages) that may be mapped to corresponding portions of a host memory; and more than one allocable portion may be mapped to the same portion of physical memory. The invention provides a memory management method and corresponding system implementation in which at least one subset of the address space of at least one selected context is sampled, randomly or otherwise. For each of at least one of the separately allocable portions of the sampled subset, a count is determined of how many separately allocable portions of any context are mapped to the same portion of the physical memory and, for each context, a metric is computed a function of its counts. A host memory allocation decision for the contexts is then based in part based on their respective metrics.

Sampling may be done in response to a triggering event, for example, when the system reclaims one or more portions of host memory from one or more of the contexts.

The counts are preferably kept as entries in a count buffer, wherein each of the counts is a number indicating the total number of pages of the address spaces of the contexts that are backed by the same page of host memory as the sampled page. Preferably only non-zero pages are counted.

The metric is preferably a function of a mean of the counts, such as the harmonic mean, the geometric mean, or the arithmetic mean. The metric may also be the median of the counts. Moreover, the count values may be weighted in the computation of the metric.

The invention also comprises swapping out to secondary storage (usually, disk) the host memory portions corresponding one or more portions of the address space of a context responsive to the metric. In page-oriented memory architectures, this preferably entails swapping out a corresponding page of the host memory to secondary storage if the count of the total number of pages of the address spaces of the contexts that are backed by this corresponding page of the host memory is less than or equal to a threshold value.

One example of a threshold value is a measure of page sharing, for example, per-context or system-wide.

The invention also provides a method for estimating current memory allocation for a context using the metric. A target future memory allocation can then also be derived for the context from the current memory allocation for the context.

Furthermore, a memory allocation target for the context can be determined responsive to the difference between the target future memory allocation for the context and the estimated current memory allocation for the context.

DETAILED DESCRIPTION OF THE INVENTION

Figure 1:
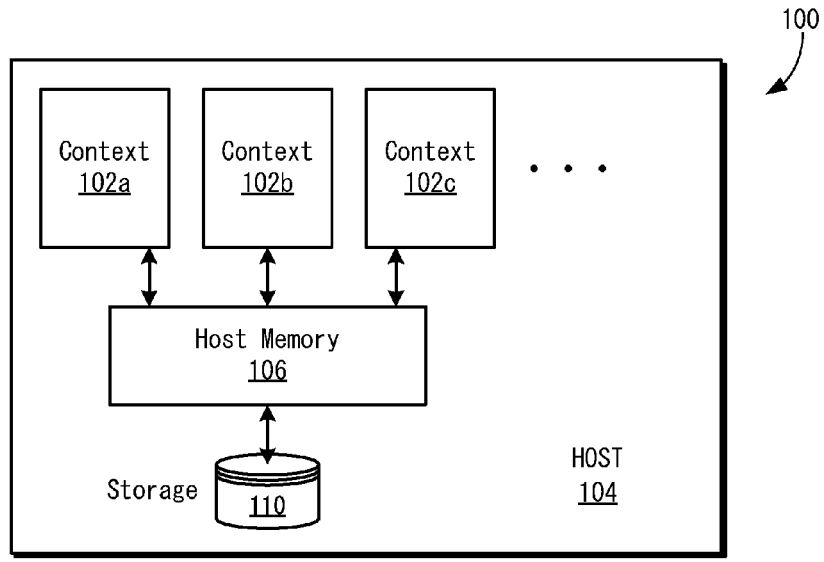
FIG. 1 is a simplified block diagram of a computer system in which multiple contexts execute concurrently on a host.
Figure 2:
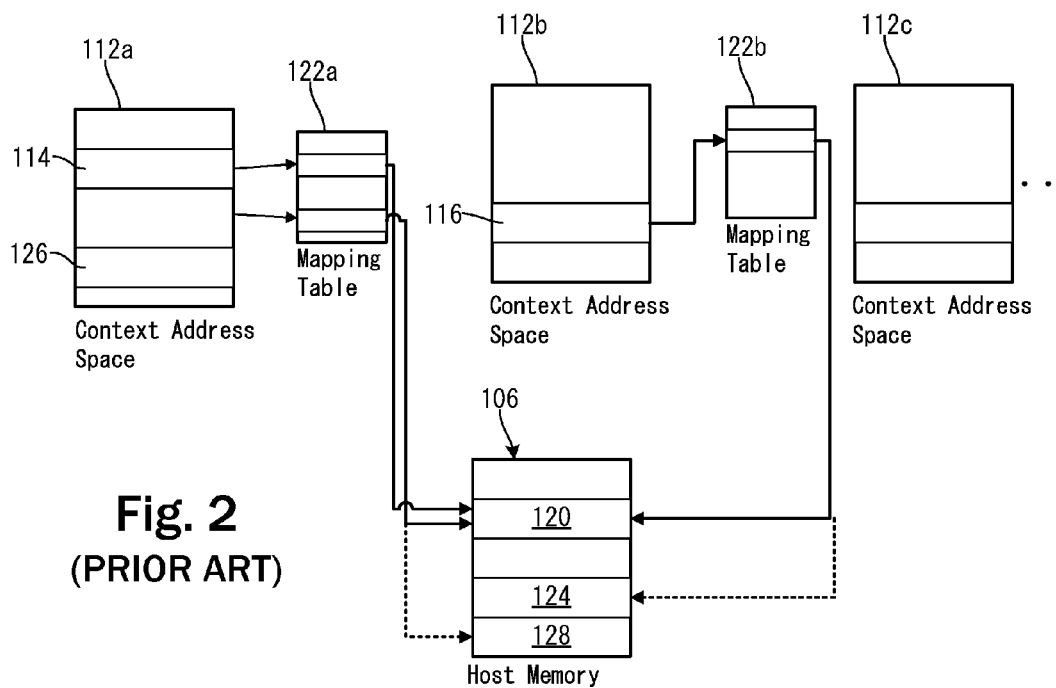
FIG. 2 depicts an example in which multiple portions of the same or different address spaces are backed by the same portion of host memory.
Figure 3:
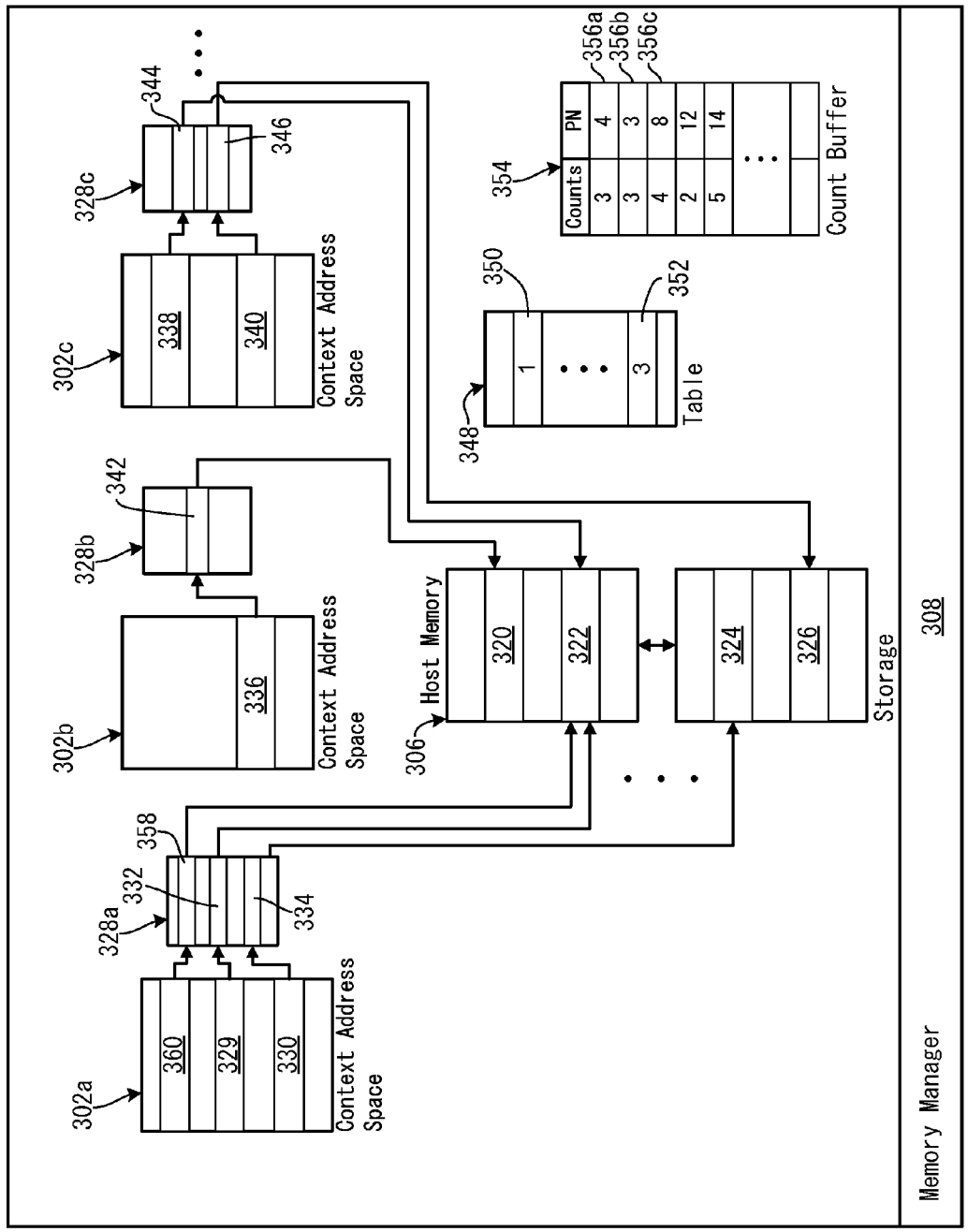
FIG. 3 is a block diagram of an embodiment of a page-oriented computer system in which one or more memory-sharing metrics are derived from counts of the number of virtual pages that are backed by the same physical page.

Referring to FIG. 3, an embodiment 300 of a computer system comprises a plurality of contexts 302a, 302b, 302c executing on a host 304. As used here, a "context" is any software entity or body of computer-executable code that underlying system software (typically, some form of operating system) schedules for execution and that receives its own allocation of system memory. The host 304 is configured to present each of the contexts 302a, 302b, 302c with an address space that may from time to time be mapped, at least in part, to a corresponding one or more portions of a host memory 306. A memory manager 308 resolves competing requests for the host memory 306 by the contexts 302a, 302b, 302c, and stores those portions of the address spaces of the contexts 302a, 302b, 302c that cannot be accommodated in the host memory 306 at a time in secondary storage 310.

The size of the address spaces may or may not bear a particular relationship with the size of the host memory 306. For example, in one possible implementation of embodiment 300, the size of the address spaces may and typically will exceed the size of the host memory 306. However, in a second possible implementation, the size of the address spaces cannot exceed the size of the host memory or a subset of the size of the host memory 306. Both such implementations are within the scope of the invention.

This invention is primarily useful in systems in which the address spaces of the contexts, the host memory 306 and secondary storage 310 are or can be apportioned into contiguous, uniformly sized portions or regions that represent the smallest sub-set of the memory/storage contents that is individually mapped and allocated to any given context. In many common computers systems, such as those with the x86 architecture, these memory/storage regions or portions are referred to as "pages;" other systems use terms such as "segments" to describe the same thing, although both terms are used non-synonymously in x86. Of course, pages usually in turn comprise many even smaller data units, such as "bytes," but allocation at such a fine granularity is seldom efficient or necessary. The invention is not limited to any particular mapping/allocation granularity, or to any particular architecture's definition of a "page" (or analogous term). Merely for the sake of easy-to-follow terminology, and without loss of generality, the explanation will use the term "page" for the portion of memory/storage allocated and mapped as a unit. Moreover, following normally accepted practice, pages in the host memory 306 and secondary storage 310 are referred to below as physical pages, and the pages in the address spaces of the contexts are referred to as virtual pages. In the embodiments of the invention that include virtual machines, which have two levels of address indirection instead of just one, these concepts are duplicated such that there is an additional distinction between guest virtual and physical pages on the one hand and their hardware equivalents on the other.

In the particular embodiment illustrated in FIG. 3, the memory manager 308 maintains page mapping tables 328a, 328b, 328c for keeping track of the physical locations of each of the pages of the address spaces for the contexts 302a, 302b, 302c. These page mapping tables map the pages of these address spaces to corresponding physical pages of either the host memory 306 or secondary storage 310. Memory manager 308 updates these mappings as the physical locations of the pages in the address spaces of the contexts 302a, 302b, 302c change.

Thus, page mapping table 328a has entries for each of the pages of the address space of context 302a. Entry 358 corresponds to page 360, and indicates (through forward mapping) this page is physically stored in host memory 306 as page 322. Entry 332 corresponds to page 329, and indicates (again, through forward mapping) this page is physically stored in host memory 306, also as page 322. Similarly, entry 334 corresponds to page 330, and indicates (again, through forward mapping) this page is physically stored in secondary storage 310 as page 324.

Page mapping tables 328b and 328c perform similar functions for contexts 302b and 302c, respectively. Thus, entry 342 of table 328b corresponds to page 336, and indicates (through forward mapping) this page is physically stored in host memory 306 as page 322. Similarly, entry 344 of table 328c corresponds to page 338, and indicates (through forward mapping) this page is physically stored in host memory 306 as page 320. Entry 346 of table 328c corresponds to page 340, and indicates (through forward mapping) this page is physically stored in secondary storage 310 as page 326.

In this particular embodiment, the memory manager 308 also identifies pages in the address spaces for the same or different contexts that contain identical data and that are therefore mapped to (backed by) the same physical pages. Examples of computer systems with such page-sharing functionality are described in the previously incorporated-by-reference U.S. Pat. Nos. 6,789,156 and 6,075,938. Through suitable entries in the page mapping tables, the memory manager 308 maps these pages to the same physical pages stored in host memory 306. Thus, pages 360 and 329, in the address space for context 302a, and page 336 in the address space for context 302b, previously determined by the memory manager 308 to contain identical data, are mapped to the same physical page 322 stored in the host memory 306.

In this embodiment, the memory manager 308 also maintains a table 348, containing entries for each of the pages of the physical memory 306, with each entry indicating for the corresponding page whether that page backs more than one virtual page and, if so, the number of virtual pages that are backed by that page. For example, entry 350, corresponding to page 320 in host memory 306), indicates that page 320 backs only one virtual page, page 338 in the address space of context 302c. Similarly, entry 352, corresponding to page 322 in host memory 306, indicates that page 322 backs three virtual pages, pages 260 and 329 in the address space for context 302a, and page 336 in the address space for context 302b. As the number of virtual pages that are backed by the same physical page in host memory 306 changes, the memory manager 308 makes corresponding updates to the entries in table 348.

A data structure such as an array, linked list, hash table, etc., for each of the contexts is also made available in this embodiment for use by the memory manager 308 in computing the chosen page-sharing metric; of course, each context could equivalently be assigned a portion of a single data structure used for all contexts. For the sake of simplicity, this data structure, or the portion assigned to a given context, is referred to below as a "count buffer" or simply "buffer." The count buffer associated with context 302a is identified in the figures with numeral 354. This count buffer 354 preferably retains a predetermined number of the most recent entries added to the buffer, by automatically evicting the older entries on a first-in-first-out basis.

According to one approach, the memory manager 308 utilizes the buffer 354 in the course of computing a metric for a particular context. In this approach, the memory manager 308 samples the address space of the context, such as through uniform random sampling, and, if a page is encountered that appears to the selected context as a "shared" page, i.e., a page that is backed by a physical page in host memory 306 that backs at least one other page in the same or different address space, the memory manage 308 adds an entry to the buffer 354 containing an identifier of the sampled virtual page in the address space of the context in question, and a count of the total number of virtual pages, in all the contexts 302a, 302b, 302c, that are backed by the same physical page as the sampled page. The memory manager 308 obtains this count through a suitable access to the table 348. For example, assuming the address space of context 302a is undergoing sampling, and virtual page 360 is one of the pages that is encountered during the sampling, by following the forward mapping through page mapping table 328a, the memory manager 308 determines that this page is backed by physical page 322 in host memory 306. Through a suitable access to the corresponding entry 352 in table 348, the memory manager 308 also determines that this physical page 322 backs a total of three virtual pages. Hence, the memory manager 308 adds an entry, entry 356a, to the count buffer 354. In this particular embodiment, the entry has two fields, the first a count of the total number of virtual pages that are backed by the same physical page as the sampled virtual page, in this case, three, and an identifier of the sampled virtual page in the address space for context 302a. In this example, the identifier of the virtual page 360 is assumed to be "4".

Note that, in this particular embodiment, a count for a sampled page that appears to the selected context to be a "shared" page could be "1", indicating that, as of the time of sampling, only the sampled page is backed by the physical page in the host memory 306. This situation could arise, for example, in the case where a physical page P backs two virtual pages V1 and V2 in different contexts, the second content modifies V2, and then the metric updating procedure for the first context samples the virtual page V1. Pursuant to a copy-on-write protocol, where the physical page P is maintained on a read-only basis, the modification of V2 results in a private copy P' of the physical page P being made, and a change in the forward mapping of V2 from P to P', leaving only V1 mapped to P. That in turn results in a change to the corresponding entry in table 348 to indicate that only one virtual page is backed by P. Moreover, because backmaps are not maintained, there is not an efficient way to notify the first context that the sampled page V1 is no longer shared, i.e., backed by a physical page that in turn backs at least one other virtual page in the same or different address space as the sampled page, at least until the first context writes to V1. Hence, to the first context, V1 still appears to be a "shared" page. Consequently, at the time V1 is sampled, the corresponding entry for page P identifies P as backing a single "shared" page. As the sampling continues, additional entries are made in the buffer 354.

In one approach, once a statistically significant number of entries have been made in the buffer 354, the memory manager 308 determines one or more memory-sharing metrics from the entries in the buffer 354. FIG. 3 shows a particular example where the buffer 354 is populated with entries 356a, 356b, 356c, obtained during the course of sampling the address space of context 302a. Entry 356a, for example, indicates that virtual page number 4 in the virtual address space for context 302a is backed by two other virtual pages, for a total of three. Of course, one could equivalently have the entry be "2," representing how many other pages share the same host page, that is, the degree of sharing, and then add one for computation of the metrics below. Even other types of entries could be used, the key point being simply that they should indicate the total number of pages of the address spaces of the contexts that are backed by the same page of host memory. The other entries convey similar information for virtual pages in the address space of context 302a that, during sampling, are determined to be backed by a physical page in host memory 306 that also backs at least one other virtual page, in the same or different address space.

Figure 4:
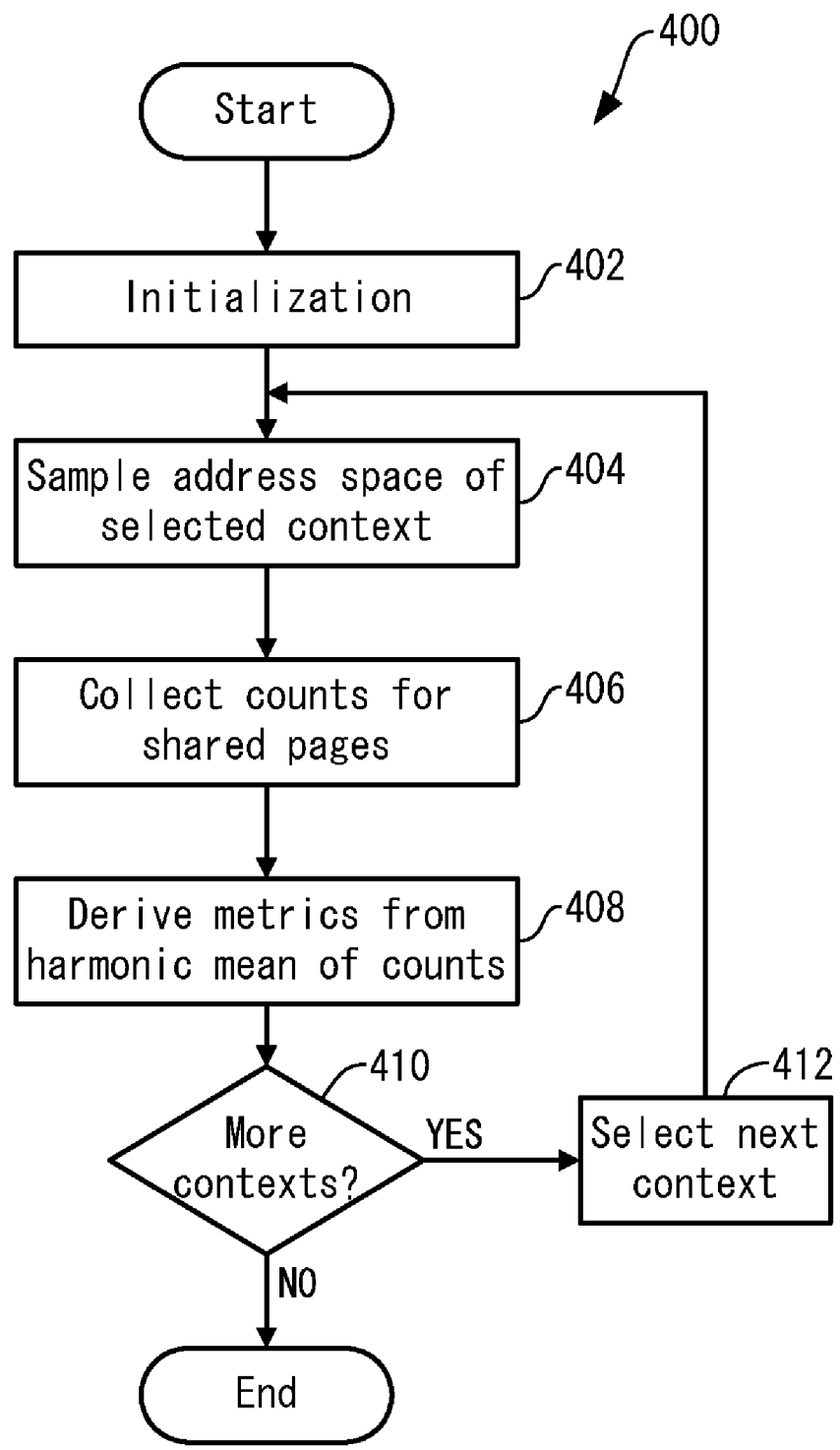
FIG. 4 is a flowchart of a method for evaluating one memory-sharing metric according to the invention.

A flowchart of an embodiment 400 of a method of evaluating one or more memory-sharing metrics in the system of FIG. 3 is illustrated in FIG. 4. In this particular embodiment, the method is assumed to be performed periodically, although, as will be discussed below, embodiments are also possible where the method is also performed upon the occurrence of one or more predefined triggering events, such as, for example, an attempt by the system to swap pages from the host memory 306 to secondary storage 310. Also, in this particular embodiment, the method is assumed to evaluate, that is, compute, one or more memory-sharing metrics for each of the active contexts, which are the contexts concurrently executing on the system, but it should be appreciated that embodiments are possible where the method only evaluates one or more memory-sharing metrics for one or a subset of the contexts.

Step 402 comprises an initialization step, in which one of the active contexts is selected for evaluation according to a chosen metric, and where other initialization tasks may be performed, such as, for example, zeroing out or otherwise initializing entries of the count buffers, such as count buffer 354.

Step 404 follows step 402, and comprises sampling the address space of the selected context. Various approaches for performing this sampling are possible, but the basic concept, in this particular embodiment, is, for example, to randomly sample a representative sub-set of the address space of the selected context so that the resulting one or more memory-sharing metrics will, with sufficiently high probability, accurately represent the whole address space.

Step 406 follows step 404. In step 404, for each page encountered in sampling step 404 that appears to the selected context as "shared" page, i.e., appears to be a page backed by a physical page that backs at least one other virtual page in the same or different address space, a count of the total number of virtual pages in all the active contexts that are backed by the same physical page as the sampled page is collected.

In one approach, the goal is to sample a sub-set, for example, an integer number S of the shared non-zero pages of the address space of the selected context that are backed by a physical page, where a zero page is a page where each byte contains the value zero, and a non-zero page is any page that is not a non-zero page, i.e., has at least one byte containing a non-zero value. The focus of this particular approach is to use at least one metric that estimates the degree of non-zero page sharing and/or memory savings, it being assumed that zero pages are sufficiently common so that metrics for these pages may be tracked explicitly and hence do not need to be estimated. The sampling is preferably random, but may be distributed deterministically in some predetermined way so as to develop a sufficiently accurate representation of the degree of page-sharing.

Using the approach of random sampling, the integer S is chosen to be large enough to reduce the statistical error of the resulting one or more metrics to a desired level. (In the case of random sampling, this error is proportional to the inverse of the square root of S.) However, since it is not known a priori whether a particular page is a shared, non-zero page, a number R of randomly selected pages in the address space of the selected context are sampled. One issue that then arises is how to choose R, since it will in general also not be known a priori how sparse (roughly, percentage of non-zero shared pages) the memory space of a given context will be. The choice of R involves a tradeoff, with at least two considerations in mind: R should be large enough to get a reasonable number of samples S to be statistically significant (yielding enough non-zero pages) but at the same time R should bound the amount of work the system must do to find S. Note that there is tension between these reasons: a larger R will help increase S to reduce sampling error, while a smaller R will bound the computational cost of sampling. In one implementation of the invention, R was simply chosen to be a small multiple of S (such as R=2*S) as a compromise to bound the cost of sampling while also increasing the chance of finding a reasonable number of samples S. This method has the advantage of simplicity and speed, but other methods may also be used, at the cost of greater effort. For example, R, and therefore S/R (the likelihood of getting a non-zero page) could be estimated in a first pass (checking for non-zero pages) through at least some subset of the memory space of interest. As another example, the system could continue to sample—randomly or otherwise—until it got "enough" non-zero pages (where "enough" is according to any predetermined measure), optionally with some predetermined cut-off so that too much time is not used in the search.

In one approach, counts of the non-zero, shared pages are collected. In this approach, when a non-zero, shared page is identified during sampling, an entry is made in the count buffer corresponding to the particular context involved, for example, count buffer 354 corresponding to context 302a in FIG. 3, containing the page number of the virtual page, which is an identifier of the page in the address space of the selected context, and the total number of virtual pages, across all the active contexts, that are backed by the same physical page as the sampled page. As previously described, this latter value is obtained from the corresponding entry in table 348, which is the entry for the physical page stored in host memory 306 that the sampled page is mapped to. Table 1 shows an example of the format of an entry made in the count buffer:

TABLE 1

| | |
|---|---|
| Valid | //indicates whether the entry is in use or not. |
| PN | //virtual page identifier of sampled page. |
| Ref_Cnt | //count of the total number of context (virtual) pages backed by the same corresponding physical page as the sampled page. |

Step 408 follows step 406. In this step, the method computes one or more memory-sharing metrics for the selected context as a function of the counts for that context. In one approach, this step evaluates two related metrics for the selected context. The first is the degree of non-zero page sharing for pages in the address space of the selected context, which, in this particular approach, is defined as the ratio of the number of shared, non-zero virtual pages in that address space to the amount of physical memory (in terms of fractions or numbers of physical pages) allocable to the selected context that is necessary to support the shared, non-zero virtual pages. The second is the total number of saved pages (both zero and non-zero) for the selected context due to page sharing (again, both zero and non-zero) for the selected context.

The invention may use a wide variety (singly or in combination) of metrics to determine how to allocate the memory resource among the various contexts that may contend for it, despite page-sharing. Common to all the metrics according to the invention is that they are functions of the sharing counts for the contexts. One group of metrics that are relatively easily computed yet provide a meaningful measure of the degree of page-sharing for a context comprises various notions of a "mean." For example, given a set of counts $n_1, n_2, \ldots, n_M$ the three "Pythagorean" means are (i=1, ... M):

$$\text{Arithmetic mean} = 1/M * \Sigma n_i \qquad \text{(Eq. 1)}$$

(the common "average"—the sum of the counts divided by the number of counts);

$$\text{Geometric mean} = \sqrt[M]{\Pi n_i} \quad \text{(Eq. 2)}$$

(the M-th root of the product of the counts); and $$\text{Harmonic mean} = M/\Sigma(1/n_i) \quad \text{(Eq. 3)}$$

(the number of counts divided by the sum of the reciprocals of the counts)

Of course, each of these means may be scaled as needed for computational efficiency, and the component terms of each formula may also be weighted. Moreover, as indicated above, these metrics are examples and are not an exhaustive list. For example, the median (the value for which there are many counts greater than as less than) of the counts may also be used as or in the metric computation (or as one of the metrics, if more than one is used to pick which context to reclaim memory from).

Each metric of course represents a different design choice. Note that if all the counts are equal, then all of the Pythagorean means also yield the same result. The different means thus differently emphasize the importance of variation in the values. For example, the contribution of an increasingly large term is linear in the unweighted arithmetic mean, is proportional to the square root of the term in the geometric mean, and is proportional to the reciprocal of the term in the harmonic mean. In other words, the harmonic mean "de-emphasizes" relatively large values more than the geometric mean, which de-emphasizes them more than the arithmetic mean.

During development of one prototype of the invention (in which the contexts were virtual machines), the inventors determined that the harmonic mean was a particularly advantageous metric in that its use was particularly good at reducing the need to swap pages. The invention will therefore be described below using the harmonic mean as the metric. This is of course by way of example only, however; as is mentioned below, the invention envisions use of any metric that evaluates the page-sharing counts—the "best" such metric to use in any given implementation of the invention will be a definitional design choice that those skilled in the art of computer memory management systems will be able to make.

One other advantage of the harmonic mean is its relation to the concept of sharing. For example, if a page in each of three contexts A, B and C are all mapped to and thus share a single physical page, then each context can be viewed as "consuming" or "occupying" ⅓ of the physical page, since the three together are taking up only one third as many pages as they would if each of their virtual pages were mapped to its own physical page, that is, if they did not share. In this case, the harmonic mean accordingly assigns to each context an increased accounting "charge" of ⅓—the more a page is shared the less it will "cost" the context in the harmonic mean. For the sake of memory allocation decisions, assuming all contexts have an equal nominal right to memory (or at least a given amount or percentage of memory, which need not be equal for all contexts), the likelihood of having memory reclaimed (and thus losing allocation of the relatively high-speed memory resource) is advantageously tied to the total "charge" against a context—the more a context has shared pages, and more widely shared they are, the less likely it is to need to have its memory allocation reduced.

Figure 5A:
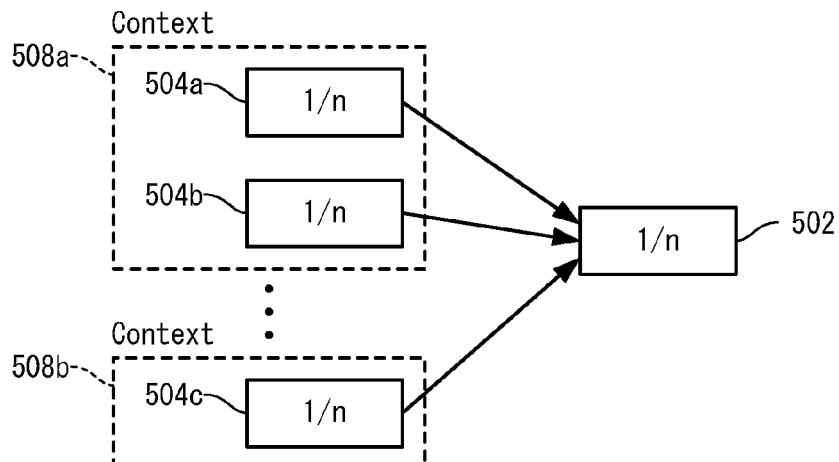
FIGS. 5A and 5B illustrate examples of how certain terms are evaluated for use in computing a preferred metric to determine a level of page sharing.

Just for the sake of additional clarity of the use and indeed, the intuitiveness of the harmonic mean (the analysis will be analogous for other means), consider FIG. 5A, which shows shared, non-zero pages 504a, 504b, 504c, all being mapped to the same physical page 502 stored in the host memory 306. In the example shown, it is assumed that pages 504a and 504b are in the address space of the same context, context 508a, and that page 504c is in the address space for a different context, context 508b. Assuming further there are a total of n non-zero virtual pages that are backed by the one physical page, as explained above, the proportional, incremental charge for the physical page 502 that is assigned to each virtual page, using the harmonic mean as the metric, is 1/n.

For context 508a, the degree of non-zero page sharing is thus given by 2/((1/n)+(1/n)) or n. For context 508b, the degree of non-zero page sharing is given by 1/(1/n) or n. In other words, for both contexts 508a and 508b, whose address space contains at least one of the n virtual pages that is backed by the same physical page, the degree of page sharing is n.

Figure 5B:
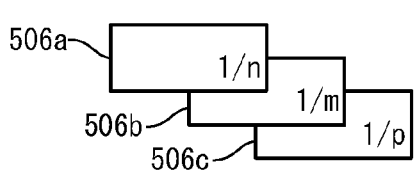

Next, assume that a context has more than one non-zero shared page. Consider, for example, FIG. 5b, depicting a context that has three non-zero, shared pages, 506a, 506b, 506c. The first, identified with numeral 506a, is assumed to correspond with a physical page that backs a total of n virtual pages from one or more contexts. Hence, the charge for the physical page that is allocable to the context is given by 1/n. The second, identified with numeral 506b, is assumed to correspond with a physical page that is backed by a total of m contexts. Hence, the portion of the physical page that is allocable to the context is given by 1/m. The third, identified with numeral 506c, is assumed to correspond with a physical page that is backed by a total of p contexts. Hence, the charge for the physical page that is allocable to the context is given by 1/p. Considering all these values together, one measure of the degree of non-zero page sharing for the context is given by $3/((1/n)+(1/m)+(1/p))$.

Now, generalizing this calculation to the case where there are N shared, non-zero pages in the address space for the context, and where the counts of the total number of virtual pages that are backed by the same physical page as each of the N shared, non-zero virtual pages are given by $n_i$, where $1 \leq i \leq N$, then a measure of the degree of page sharing for the selected context is given by $N/\Sigma(1/n_i)$, which is just harmonic mean of the counts.

Thus, the harmonic mean gives a result that is intuitively "fair" or "correct" in the sense that it follows from the preceding derivation, which is based on the notion that a charge of only 1/m should be assigned to a context if one of its virtual pages is sharing a physical pages with (m−1) other contexts (that is, m contexts are sharing the same page). As mentioned before, however, even this concept of "fairness" is a design choice that may not be applicable in all implementations of the invention.

By way of comparison, and to illustrate the design choice, consider a situation where there are five non-zero shared pages in the address space of a selected context, and the counts of the number of virtual pages that share each of the five pages, i.e., that are backed by the same corresponding physical page, are 2, 3, 4, 2, and 100. In this example, the Pythagorean means compute to:

$$\text{Harmonic: } 5/(1/2+1/3+1/4+1/2+1/100) = 3.14; \quad \text{(Eq. 4)}$$

$$\text{Geometric: } 5\sqrt{(2*3*4*2*100)} = 5.45; \quad \text{(Eq. 5)}$$

and $$\text{Arithmetic: } (2+3+4+2+100)/5 = 22.20 \quad \text{(Eq. 6)}$$

Assuming R pages were sampled, and that S non-zero, shared pages were identified during that sampling and that S corresponding entries were made in the count buffer for the selected context, e.g., count buffer 354 for context 302a, during collecting step 406, the chosen metric (such as the harmonic mean) is computed from the S most recent entries in the count buffer.

As mentioned above, it is possible that entries in the buffer 354 may become outdated, that is, invalid or incorrect, for example, because of modifications of a context's virtual page that shares a physical page with one or more other contexts' virtual pages. It is therefore possible that the number S for a particular context will be greater than the number of valid entries in that context's buffer. In other words, the indicated sharing count for one or more virtual pages may be incorrect. The issue is then how to compute the sharing metric, or rather, which terms to include in the computation. One way to handle this situation is simply to ignore any invalid entries and compute the metric using a reduced, but valid, set of count terms. This approach—using only actually observed values—may be appropriate when the number of "invalid" samples is low. As an example, assume that eight non-zero shared pages of a context's memory are sampled, but that three of the corresponding count buffer entries are for some reason invalid. If the valid values are 2, 3, 4, 2, and 100 as above, and the other three values are simply ignored, the harmonic mean of the reduced set of sample values is still 3.14.

Another solution, which may be better when the number of invalid entries is high, is instead to assume that each invalid count term is the same as some default value, such as a measure Q indicating the average degree of non-zero page sharing, either per-context, or system-wide (across all active contexts). To illustrate, let Q be the total number of non-zero shared pages divided by the number of physical pages needed to support the non-zero, shared pages. Now assume the same example and values as in the immediately preceding paragraph, with only five out of eight entries being valid. Assume further that Q is found to be 2. Substituting Q for each of the missing values yields a harmonic mean of $8/(1/2+1/2+1/3+1/3+1/100+1/2+1/2+1/2)=2.52$.

As stated earlier, shared zero pages (pages containing all zero values) preferably are not factored into the calculation of the metric, since one can assume that zero pages are sufficiently common that metrics for zero pages are tracked explicitly and do not need to be estimated. Another reason for excluding counts for shared zero pages is that in practice a large number of pages tend to map to a zero physical page, so that, as a practical matter, the degree of zero-page sharing is infinite, or at least orders of magnitude larger that the degree of non-zero page sharing. Hence, to improve estimation accuracy, the counts for the shared zero pages are preferably excluded from the computation of the sharing metric, although it should be appreciated that embodiments are possible where these counts are factored into that calculation.

In one embodiment, two memory-sharing metrics are computed for each of the active contexts. The first metric—the sharing metric discussed above, such as the harmonic mean H of the counts $n_i$—and an estimate of the degree of non-zero page sharing for the selected context, is useful for deciding which, if any, of the pages of the selected context are candidates for swapping out to secondary storage 310.

In one approach, when a context has been identified as a candidate for memory reclaiming and/or swapping, randomly selected pages in the address space of that context that are mapped into physical pages stored in the host memory 306 are each evaluated by retrieving the number of virtual pages that are backed by the same corresponding physical page as obtained from the corresponding entry in table 348. If the count is less than a threshold value, such as the first metric, indicating that the degree of sharing of the page is less than the average degree of page sharing for the context, then the page is identified as a candidate for swapping out to secondary storage. Otherwise, the page is retained in the host memory 306, as the degree of sharing of the selected pages equals or exceeds the metric value for the context. In an alternate approach, the count for a randomly selected page is compared with Q, the system-wide degree of non-zero page sharing. If the count if less than or equal to Q, the page is swapped out to secondary storage 310. The benefit of retaining heavily shared pages in the host memory 306, which applies to both these approaches, is that heavily shared pages generally take longer to free up than pages that are not shared as much, so by retaining these pages in the host memory 306, the overhead of having to swap these pages back into the host memory 306 at a future time to satisfy memory accesses is avoided. Moreover, and more importantly, heavily-shared pages make more efficient use of physical memory than lightly-shared pages (or non-shared pages). Another alternative approach is to avoid swapping out any shared pages. While this approach is simple to implement, it can result in system lock-up if there are no non-shared pages left in the system that are available for swapping out. In general, it is preferable not to swap any shared pages to avoid such lock-up, but in some cases, such as when nearly all of the context's pages are shared, there may be no other choice.

The second metric, the memory savings due to page sharing in the selected context, will now be addressed. That metric can also be derived from the harmonic mean of the counts collected for the shared, non-zero pages. Referring to FIG. 5A, showing n non-zero pages 504a, 504b, 504c, each supported by the same physical page 502, the "cost" of this physical page allocable to any one virtual page (in terms of numbers or fractions of pages) is 1/n. Thus, the memory "savings" to any one virtual page (in terms of numbers or fractions of pages) is $(1-1/n)$.

Now, referring to FIG. 5B, showing three pages 506a, 506b, 506c, all assumed to be in the address space for the same context, the "cost" of this arrangement allocable to the context (again, in terms of number or fractions of pages that are "charged" against the context) is $1/n+1/m+1/p$. Thus, the memory "savings" of this arrangement to this context is $(1-1/n)+(1-1/m)+(1-1/p)=3\times(1-1/n+1/m+1/p)/3)$, which is $3\times(1-1/H)$, where H is the harmonic mean of the three counts n, m and p. Note the surprising result that the harmonic mean turns up in this derivation of cost and savings of shared memory allocation.

Generalizing this to the case where there are a total of N non-zero, shared pages in the address space for the context, with the counts of the number of virtual pages backed by each of the respective physical pages is given by $n_i$, $1 \leq i \leq N$, the memory savings to the context due to the non-zero page sharing is given by $N\times(1-\Sigma(1/n_i)$ or $N\times(1-1/H)$, where $H=N/\Sigma(1/n_i)$, the harmonic mean of the counts $n_i$.

To factor in the effect of shared zero pages, if Z is the number of shared zero pages in the selected context, which are assumed to cost nothing, then the total savings ("SA") due to page sharing (both zero and non-zero pages) is given by $SA=Z+N\times(1-1/H)$, where $H=N/\Sigma(1/n_i)$, the harmonic mean of the counts $n_i$.

This second metric, SA, derived from H, the harmonic mean of the count $n_i$, according to the formula $SA=Z+N\times(1-1/H)$, is an estimate of the total memory savings due to page sharing (both zero and non-zero pages) for a context. This second metric is often used for deciding whether and how much host memory 306 to allocate to or reclaim from the context. In one approach, this second metric, expressed as the number of pages saved, is used to estimate the current memory allocation for the context according to the formula whereby the current estimated allocation equals the number of virtual pages in the context backed by physical pages minus the number of pages saved. This current allocation is then combined with one or more other parameters, such as the memory "shares" for the context, i.e., a user-settable parameter indicating the relative proportion of rights to the host memory 306 held by the context in relation to the other contexts, or the memory working set estimate for the context, to determine the target future allocation for the context. The difference between the two is then used as a memory allocation or reclamation target for the context. For additional information on memory shares, the reader is referred to Carl A. Waldspurger, "Memory Resource Management in VMware ESX Server," Proceedings of the Fifth Symposium on Operating Systems Design and Implementation (OSDI '02), Boston, Mass., December 2002, which is incorporated by reference herein as though set forth in full.

For example, assuming a policy that favors those contexts that have the greatest need for host memory 306, a context that, all else equal, exhibits more memory savings due to page sharing is given a smaller target allocation of host memory 306 than is a context that exhibits less memory savings since that context needs more physical memory to support the same amount of pages. In contrast to this, assuming a policy that favors those contexts that support and enable the greatest number of other contexts, a context that exhibits more memory savings due to page sharing is given a larger target allocation of host memory 306 than is a context that exhibits less memory savings due to page sharing since the former supports and enables a greater number of other contexts. In both approaches, at various times, the memory manager 308 compares the actual allocations with the target allocations, and makes adjustments accordingly, such as allocating additional host memory if the actual allocation to a selected context falls below its target, or reclaiming host memory from a selected context if the actual allocation exceeds its target. Of course, other examples are possible, so nothing in the foregoing should be taken as limiting.

Turning back to FIG. 4, once one or more metrics for the selected context have been derived, the method resumes with step 410, which inquires whether there are additional active contexts executing on the system for which the metric has not yet been computed in the current cycle. If so, a jump is made to step 412. If not, the method concludes. In step 412, the method selects the next active context for metric evaluation, and then jumps to step 404, where the method repeats for this next context.

In one embodiment, the sampling, collecting, and computing steps 404, 406 and 408 depicted in FIG. 4 can also be performed for one or more of the contexts upon the occurrence of predefined triggering events, such as, for example, an attempt by the system to reclaim host memory from a selected context, or an effort by the system to swap out pages for a selected context. Other examples of a possible triggering event are that the total amount of free host memory drops below a threshold, or that there is a significant change (greater than some threshold) in the total system-wide number of shared pages—more sampling may be beneficial when the system detects that the number of copy-on-write pages on the host is changing a lot, since this may indicate that that existing estimates are becoming stale. At such times, the system may perform steps 404, 406, and 408 for the selected context, thereby updating the metrics for that selected context precisely at the time when the greatest accuracy in these metrics is called for.

To support this approach, as discussed previously, a plurality of count buffers (either separate or consolidated into the same physical memory) is provided in the system, so that each active context is assigned its own count buffer. Entries would be added to the count buffer for a particular context both during one of the periodic cycles depicted in FIG. 4, and also upon the occurrence of one or more of the predefined events. The metrics for the selected context would be re-computed, and therefore updated, both during one of the periodic cycles and also upon the occurrence of one or more of the predefined triggering events. The entries used in the metric evaluations at such times could be a mixture of entries added during one of the periodic cycles and entries added upon the occurrence of one or more of the predefined events. The count buffer for a context would retain these entries for use in subsequent metric evaluations until they are overwritten by newer entries for the context. Notably, entries from other contexts would not overwrite these entries, as these entries would be made in another count buffer.

In a variant of this approach, prior to adding entries to the count buffer for a particular context as part of the collecting step 406 in FIG. 4, the count values in the existing entries for that context are zeroed out, but the page identifiers in those entries are retained. Then, after all the new entries for that context resulting from sampling step 404 have been added to the count buffer as part of step 406, any entries for that context having zeroed count values but which have not been overwritten by the new entries are evaluated. More specifically, these entries, which represent pages that were deemed to be shared, non-zero pages in the recent past, are evaluated to determine if they still represent shared, non-zero pages. If so, the count values for the entries are updated with the current number of virtual pages backed by the same corresponding physical page, as determined using suitable accesses from table 348. If not, the entries are marked for deletion. Put another way: In some embodiments, during a new sampling "round," the system could "refresh" the counts associated with sampled pages already in the buffer from previous rounds. Of course, if, during lookup of the current information for a given page, the system finds that it is no longer shared, the system can invalidate the entry for a page or evict it from the table.

One of ordinary skill in the art will appreciate that many more embodiments and implementations are possible that are within the scope of this invention than those described above. For example, as discussed previously, although page-oriented virtual and physical address spaces, memory and secondary storage have been assumed in the foregoing description, it should be appreciated that embodiments are possible wherein the physical and virtual address spaces and memory of the system are divisible into any uniformly or non-uniformly sized portions or segments, whether or not considered to be pages, and whether contiguous or not. Additionally, although the host memory 306 is typically a memory, such as RAM, that is faster but more expensive than secondary storage 310, usually disk storage, one of ordinary skill in the art should appreciate the invention is not limited to these features. Also, one of ordinary skill in the art will appreciate that the method of FIG. 4 may be tangibly embodied as a computer program product, for example, a computer program stored on a computer-readable storage medium, for use in or execution by a computer in the system 300 or host 304.

In one embodiment, the host 304 is a computer or computer system, and the contexts 302a, 303b, 303c are processes executing concurrently on that computer or computer system, representing, for example, different users or applications. The memory manager 308 in this embodiment is part of the operating system resident on that computer or computer system, and is configured to support a virtual memory system, whereby each of the processes is presented with a virtual address space that may exceed the physical size of the host memory 306. In this embodiment, assuming a page-oriented virtual memory system, pages in the virtual address space for a process may be referred to as virtual pages to distinguish them from the physical pages stored in host memory 306.

In a second embodiment, the host 304 is again a computer or computer system, but the contexts 302a, 303b, 303c are virtual machines executing concurrently on that computer or computer system. The memory manager 308 in this embodiment is part of the virtualization layer, which is software that supports concurrent execution of the multiple virtual machines on the same host, which may work alone or in conjunction with the host operating system. As in the first embodiment, the memory manager 308 in this second embodiment is configured to support a virtual memory system, whereby each of the virtual machines is presented with a virtual address space that may exceed the physical size of the host memory 306. In this case, however, the virtual address spaces presented to the virtual machines may be referred to as guest physical address spaces, indicating that, from the standpoint of the virtual machines, they are physical, although, from the standpoint of the host, they are virtual. In this embodiment, assuming a page-oriented virtual memory system, pages in the guest physical address space of a virtual machine may be referred to as guest physical pages to distinguish them from the physical pages stored in host memory 306 (which may also be referred to as host physical pages or "machine pages").

In a third embodiment, the host 304 is again a computer or computer system, but the contexts 302a, 303b, 303c are guest processes executing concurrently on that computer or computer system in the same or different virtual machines. As in the second embodiment, the memory manager 308 in this embodiment is part of the virtualization layer, which may work alone or in conjunction with the host operating system. Also, as in the second embodiment, the memory manager 308 in this third embodiment is configured to support a virtual memory system, whereby each of the guest processes is presented with a virtual address space that may exceed the physical size of the host memory 306. In the case, however, the virtual address spaces presented to the guest processes may be referred to as guest virtual address spaces, indicating that, from the standpoint of both the virtual machines and the host, they are virtual. In this embodiment, assuming a page-oriented virtual memory system, pages in the guest virtual address space of a guest process may be referred to as guest virtual pages to distinguish them from the pages in the guest physical address spaces of the virtual machines (which may be referred to as guest physical pages) and the physical pages stored in host memory 306 (which may also be referred to as host physical pages or "machine pages").

Figure 6:
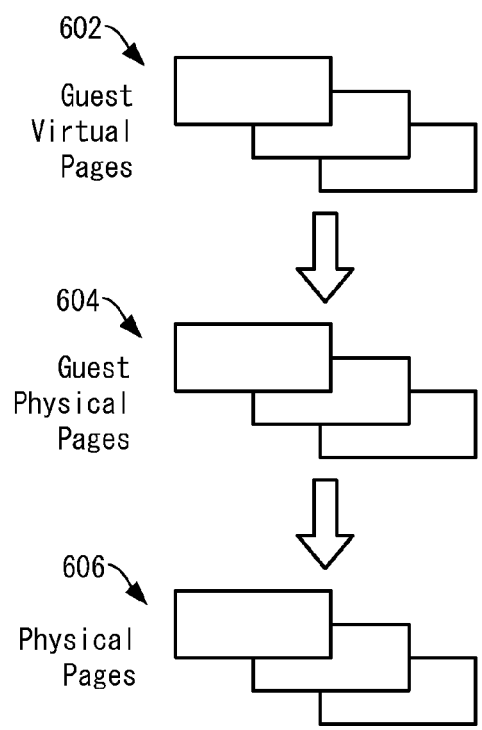
FIG. 6 is a figure illustrating a two-level page mapping hierarchy in an embodiment of a page-oriented computer system in which multiple contexts are resident on a host, wherein the contexts are virtual machines and/or guest processes resident in the same or different virtual machines.

In this embodiment, as shown in FIG. 6, the guest virtual pages 602 in a guest virtual address space are mapped through a two-level hierarchy to the physical pages 606 stored in the host memory 306. In the first level, the guest virtual pages 602 are mapped to guest physical pages 604 in the guest physical address space of the virtual machine where the guest process resides. In the second level, the guest physical pages 604 are mapped to the physical pages 606 (which may also be referred to as host physical or "machine" pages).

Combinations of any of the foregoing embodiments are also possible such as, for example, a hybrid embodiment where the host 304 is again a computer or computer system, but the contexts 302a, 303b, 303c are virtual machines and/or guest processes in the same or different virtual machines executing concurrently on that computer or computer system.

For additional details regarding virtual machines and/or guest processes resident on such virtual machines, the reader is referred to the previously incorporated-by-reference U.S. Pat. Nos. 6,789,156 and 6,075,938.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A memory management system for a computer system that has
   a host hardware platform that includes host memory, which comprises a host memory address space;
   at least one host processor;
   a plurality of resident contexts, each context comprising a body of computer-executable code stored in at least one computer-readable storage medium accessible by the computer system and each context having an address space divided into separately allocable portions that may be mapped to corresponding portions of the host memory; and
   a memory management sub-system, the memory management sub-system comprising code executable by the processor, the memory management sub-system performing operations of:
      for each of a plurality of selected contexts, selecting a sample of the separately allocable portions of the address space of the context;
      determining, for each of at least one of the separately allocable portions of each of the samples, the corresponding portion of the host memory to which the sampled separately allocable portion is mapped, and a count corresponding to a number of separately allocable portions of any context that are commonly mapped to the corresponding portion of the host memory;
      for each context, computing a metric that is a function of its counts; and
      allocating host memory among the contexts at least in part based on their respective metrics.

2. The system of claim 1, in which the contexts are processes.

3. The system of claim 1, in which the contexts are virtual machines.

4. The system of claim 1, in which the separately allocable portions of the address spaces of the contexts and of the host memory are pages.

5. The system of claim 4, further comprising a count buffer storing the counts as entries.

6. The system of claim 1, wherein the sample includes only separately allocable portions that are non-zero.

7. The system of claim 1, wherein the operation of selecting the sample comprises randomly selecting a subset of pages in the address space of the selected context.

8. The system of claim 1, wherein the operation of selecting the sample is performed periodically for each of the plurality of selected contexts.

9. The system of claim 1, wherein the operation of selecting a sample occurs in response to a triggering event.

10. The system of claim 9, wherein the triggering event is the system reclaiming one or more portions of host memory from one or more of the contexts.

11. The system of claim 9, wherein the triggering event is a drop below a threshold of a total amount of free host memory.

12. The system of claim 9, wherein the triggering event is a change greater than a threshold value in total system-wide number of shared pages.

13. The system of claim 1, in which the function used to compute the metric is one of a harmonic mean, a geometric mean, an arithmetic mean, or a median of the counts.

14. The system of claim 1, wherein the code of the memory management sub-system further identifies a separately allocable unit of host memory as a good candidate for swapping to secondary storage if the number of separately allocable portions of any context commonly mapped to the separately allocable unit of memory is less than a threshold value.

15. The system of claim 14, wherein the threshold value is a system-wide measure of page sharing.

16. The system of claim 14, wherein the threshold value for each context is a measure of an average degree of page sharing for the context.

17. The system of claim 1, wherein the allocating of the host memory for a particular context is based at least in part on an estimate of a current allocation for the particular context, the estimate of the current allocation being calculated using the metric.

18. The system of claim 1, in which the function from which the metric is computed is chosen from the group of functions consisting of a harmonic mean, a geometric mean, an arithmetic mean and a median.

19. The system of claim 1, in which the counts are weighted in the computation of the metric.

20. The system of claim 1, in which the code of the memory management sub-system further allocates one or more portions of the host memory to a context responsive to the metric.

21. The system of claim 1, in which the code of the memory management sub-system further reclaims one or more portions of the host memory from a context responsive to the metric.

22. The system of claim 1, in which the code of the memory management sub-system, in response to the metric, swaps out to a secondary storage device the host memory portions corresponding one or more portions of the address space of a context.

23. The system of claim 1, wherein the code of the memory management sub-system swaps out a selected portion of the host memory to a secondary storage device if the count for the selected portion is less than or equal to a threshold value.

* * * * *